United States Patent
Sole Rojals et al.

(10) Patent No.: US 9,392,301 B2
(45) Date of Patent: Jul. 12, 2016

(54) CONTEXT ADAPTIVE ENTROPY CODING FOR NON-SQUARE BLOCKS IN VIDEO CODING

(75) Inventors: Joel Sole Rojals, La Jolla, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 13/536,834

(22) Filed: Jun. 28, 2012

(65) Prior Publication Data

US 2013/0064294 A1 Mar. 14, 2013

Related U.S. Application Data

(60) Provisional application No. 61/503,716, filed on Jul. 1, 2011, provisional application No. 61/554,301, filed on Nov. 1, 2011.

(51) Int. Cl.
*H04N 7/26* (2006.01)
*H04N 19/625* (2014.01)
(Continued)

(52) U.S. Cl.
CPC ........... *H04N 19/625* (2014.11); *H04N 19/129* (2014.11); *H04N 19/13* (2014.11); *H04N 19/176* (2014.11); *H04N 19/18* (2014.11); *H04N 19/91* (2014.11); *H04N 19/93* (2014.11)

(58) Field of Classification Search
CPC ... H04N 19/176; H04N 19/13; H04N 19/129; H04N 19/625; H04N 19/18; H04N 19/93; H04N 19/91; H04N 7/50; H04N 7/30; H04N 7/26244; H04N 7/2625; H04N 7/26127

USPC ...................................................... 375/240.18
See application file for complete search history.

(56) References Cited

U.S. PATENT DOCUMENTS 4,975,976 A * 12/1990 Kimata ................. G06T 3/0006
375/E7.261
6,047,088 A *  4/2000 van Beek ................ G06T 9/001
375/E7.083

(Continued)

FOREIGN PATENT DOCUMENTS

CN             1665303 A       9/2005

OTHER PUBLICATIONS

Auyeung et al., "Context reduction of the last transform position in JCTVC-D262 for CE11.1", Joint Collaborative Team on Video Coding, JCTVC-E344, Mar. 16-23, 2011, 6 pp.

(Continued)

*Primary Examiner* — Shan Elahi
(74) *Attorney, Agent, or Firm* — Shumaker & Sieffert, P.A.

(57) ABSTRACT

Disclosed are techniques for coding coefficients of a video block having a non-square shape defined by a width and a height, comprising coding one or more of x- and y-coordinates that indicate a position of a last non-zero coefficient within the block according to an associated scanning order, including coding each coordinate by determining one or more contexts used to code the coordinate based on one of the width and the height that corresponds to the coordinate, and coding the coordinate by performing a context adaptive entropy coding process based on the contexts. Also disclosed are techniques for coding information that identifies positions of non-zero coefficients within the block, including determining one or more contexts used to code the information based on one or more of the width and the height, and coding the information by performing a context adaptive entropy coding process based on the contexts.

24 Claims, 11 Drawing Sheets

(51) Int. Cl.
*H04N 19/176* (2014.01)
*H04N 19/13* (2014.01)
*H04N 19/129* (2014.01)
*H04N 19/91* (2014.01)
*H04N 19/18* (2014.01)
*H04N 19/93* (2014.01)

(56) References Cited

U.S. PATENT DOCUMENTS

| | | | | |
|---|---|---|---|---|
| 6,707,948 | B1* | 3/2004 | Cosman | H04N 19/647 375/E7.027 |
| 7,394,861 | B1* | 7/2008 | Tang | H04B 7/0848 375/267 |
| 7,609,764 | B2* | 10/2009 | Sakuyama | H04N 19/15 348/416.1 |
| 8,000,546 | B2 | 8/2011 | Yang et al. | |
| 8,265,149 | B2* | 9/2012 | Jung | H04N 19/61 375/240.12 |
| 8,693,562 | B2* | 4/2014 | Meyer | H04L 27/183 375/229 |
| 2002/0003837 | A1* | 1/2002 | Kudou | H04N 19/176 375/240.02 |
| 2003/0099397 | A1* | 5/2003 | Matsugu | H04N 19/503 382/173 |
| 2004/0213349 | A1* | 10/2004 | Zador et al. | 375/240.22 |
| 2005/0025257 | A1* | 2/2005 | Goldstein | H04L 27/2657 375/316 |
| 2005/0111740 | A1* | 5/2005 | Sakuyama | H04N 19/15 382/232 |
| 2005/0147172 | A1* | 7/2005 | Winger | H03M 7/4006 375/240.23 |
| 2006/0039473 | A1* | 2/2006 | Filippini | H04N 19/56 375/240.16 |
| 2006/0268990 | A1* | 11/2006 | Lin et al. | 375/240.24 |
| 2007/0053438 | A1* | 3/2007 | Boyce et al. | 375/240.24 |
| 2007/0206678 | A1* | 9/2007 | Kondo | G06T 3/4053 375/240.17 |
| 2008/0025411 | A1* | 1/2008 | Chen | H04N 19/43 375/240.25 |
| 2008/0219578 | A1 | 9/2008 | Lee | |
| 2008/0310504 | A1 | 12/2008 | Ye et al. | |
| 2009/0080532 | A1* | 3/2009 | Marpe | H04N 19/176 375/240.24 |
| 2009/0141803 | A1* | 6/2009 | Marpe | H04N 19/176 375/240.16 |
| 2009/0175331 | A1 | 7/2009 | Karczewicz et al. | |
| 2010/0177828 | A1* | 7/2010 | Rubinstein et al. | 375/240.26 |
| 2011/0090952 | A1* | 4/2011 | Cohen | H04N 19/176 375/240.2 |
| 2011/0090954 | A1* | 4/2011 | Cohen | H04N 19/197 375/240.03 |
| 2012/0082231 | A1* | 4/2012 | Rojals et al. | 375/240.18 |
| 2012/0082232 | A1* | 4/2012 | Sole Rojals et al. | 375/240.18 |
| 2013/0064294 | A1* | 3/2013 | Sole Rojals et al. | 375/240.12 |
| 2013/0107970 | A1* | 5/2013 | Wang | H04N 19/176 375/240.18 |
| 2013/0188688 | A1* | 7/2013 | Panusopone | H04N 19/13 375/240.02 |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTV-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Cao et al., "CE6.b1 Report on Short Distance Intra Prediction Method," Joint Collaborative Team on Video Coding, JCTVC-E278, Mar. 16-23, 2011, 7 pp.

International Telecommunication Union, "Advanced video coding for generic audiovisual services," Standardization Sector of ITU, Jun. 2011, 674 pp.

Marpe et al., "Context-based adaptive binary arithmetic coding in the H.264/AVC video compression standard", IEEE Transactions on Circuits and Systems for Video Technology, Jul. 2003, 17 pp.

Invitation to Pay Additional Fees—PCT/US2012/044967—ISA/EPO—Aug. 27, 2012, 11 pp.

Sato et al., "Proposal of Non-Square Coding Unit Structure", Joint Collaborative Team on Video Coding, JCTVC-B082, Jul. 21-28, 2010, 15 pp.

Sole Rojals et al., "CE11: Parallel Context Processing for the significance map in high coding efficiency", Joint Collaborative Team on Video Coding, JCTVC-E338, Mar. 16-23, 2011, 4 pp.

Sole Rojals et al., "Parallel Context Processing for the significance map in high coding efficiency", Joint Collaborative Team on Video Coding, JCTVC-D262, Jan. 20-28, 2011, 4 pp.

SZE "Context selection complexity in HEVC CABAC", Joint Collaborative Team on Video Coding, JCTVC-D244, Jan. 20-28, 2011, 3 pp.

Wiegand et al.," WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "WD2: Working Draft 2 of High-Efficiency Video Coding", Joint Collaborative Team on Video Coding, JCTVC-D503, Jan. 20-28, 2011, 153 pp.

Auwera et al., "CE6.b: Report on SDIP Harmonization with Deblocking, MDIS, MDCS, and HE Residual Coding," JCT-VC Meeting; 97. MPEG Meeting; Jul. 14, 2011-Jul. 22, 2011; Torino; (Joint Collaborative Team on Video Coding of ITU-T SG.16 WP3 and ISO/IEC JTC1/SC29/WG11); URL: http://wftp3.itu.int/av-arch/jctvc-site/, No. JCTVC-F556, XP030009579, 15 pp.

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2012/044967—ISA/EPO—Dec. 3, 2012, 23 pp.

International Preliminary Report on Patentability—PCT/US2012/044967, The International Bureau of WIPO—Geneva, Switzerland, Nov. 14, 2013, 12 pp.

Second Written Opinion from International Patent Application No. PCT/US2012/044967, Jul. 23, 2013, 7 pp.

* cited by examiner

|   |   |   | 506 |   |   |   |   |
|---|---|---|---|---|---|---|---|
| 6 | 3 | 1 | 1 | 0 | 0 | 0 | 0 |
| 3 | 2 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |

FIG. 5A

|   |   |   | 508 |   |   |   |   |
|---|---|---|---|---|---|---|---|
| 1 | 1 | 1 | 1 | 0 | 0 | 0 | 0 |
| 1 | 1 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |

FIG. 5B

|   |   |   | 510 |   |   |   |   |
|---|---|---|---|---|---|---|---|
| 0 | 0 | 0 | 1 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 6 | 3 | 1 | 1 | 0 | 0 | 0 | 0 |
|---|---|---|---|---|---|---|---|
| 3 | 2 | 1 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |

| 6 | 3 | 1 | 1 |
|---|---|---|---|
| 3 | 2 | 1 | 0 |
| 1 | 1 | 0 | 0 |
| 1 | 0 | 0 | 0 |
| 0 | 0 | 0 | 0 |
| 0 | 0 | 0 | 0 |
| 0 | 0 | 0 | 0 |
| 0 | 0 | 0 | 0 |

FIG. 7B

CONTEXT ADAPTIVE ENTROPY CODING FOR NON-SQUARE BLOCKS IN VIDEO CODING

This application claims the benefit of U.S. Provisional Application No. 61/503,716, filed Jul. 1, 2011, and U.S. Provisional Application No. 61/554,301, filed Nov. 1, 2011, the entire contents of each of which are incorporated herein by reference.

TECHNICAL FIELD

This disclosure relates to video coding, and, more particularly, to coding blocks of residual transform coefficients generated by video coding processes.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients. Entropy coding may then be applied to achieve even more compression.

SUMMARY

This disclosure describes techniques for coding residual transform coefficients of non-square blocks of video data during a video coding process. The techniques described herein may include one or more of the following techniques: (1) techniques for selecting a scanning order to scan residual transform coefficients of a non-square block of video data; (2) techniques for determining contexts for entropy coding last significant coefficient position information for a non-square block of video data; (3) techniques for determining contexts for entropy coding significant coefficient position information for a non-square block of video data; and (4) techniques for coding values, or "levels," of residual transform coefficients of a non-square block of video data.

The techniques of this disclosure may improve efficiency for coding residual transform coefficients of non-square blocks of video data relative to other methods. In particular, the techniques may improve compression of the residual transform coefficients of the non-square blocks and related syntax information, when the coefficients and the information are coded. Additionally, the techniques of this disclosure may enable using coding systems that have lower complexity relative to other systems to code the coefficients and the related syntax information. In this manner, there may be a relative bit savings for a coded bitstream including the coded coefficients and related syntax information, and a relative reduction in complexity for a system used to code the coefficients and the related syntax information, when using the techniques of this disclosure.

In one example, a method of coding transform coefficients associated with a block of video data during a video coding process, wherein the block has a non-square shape defined by a width and a height, includes coding one or more of x- and y-coordinates that indicate a position of a last non-zero coefficient within the block according to a scanning order associated with the block, wherein coding each of the one or more of the x- and y-coordinates includes determining one or more contexts used to code the respective coordinate based at least in part on one of the width and the height of the block that corresponds to the coordinate, and coding the respective coordinate by performing a context adaptive entropy coding process based at least in part on the determined one or more contexts.

In another example, a method of coding transform coefficients associated with a block of video data during a video coding process, wherein the block has a non-square shape defined by a width and a height, includes coding information that identifies positions of non-zero coefficients within the block, wherein coding the information comprises determining one or more contexts used to code the information based at least in part on one or more of the width and the height of the block, and coding the information by performing a context adaptive entropy coding process based at least in part on the determined one or more contexts.

The techniques of this disclosure are also described in terms of an apparatus, a device comprising means for performing the techniques, and a computer-readable storage medium storing instructions that, when executed, cause one or more processors to perform the techniques.

The details of one or more examples are set forth in the accompanying drawings and the description below. Other features, objects, and advantages will be apparent from the description and drawings, and from the claims.

BRIEF DESCRIPTION OF DRAWINGS

FIGS. 5A-5C are conceptual diagrams that illustrate an example of a non-square block of video data and corresponding significant coefficient position information and last significant coefficient position information, consistent with the techniques of this disclosure.

FIGS. 7A-7B are conceptual diagrams that illustrate an example of a non-square block of video data that has been transposed, consistent with the techniques of this disclosure.

DETAILED DESCRIPTION

This disclosure describes techniques for coding residual transform coefficients of non-square blocks of video data during a video coding process. The techniques described herein may include one or more of the following techniques: (1) techniques for selecting a scanning order to scan residual transform coefficients of a non-square block of video data; (2) techniques for determining contexts for entropy coding last significant coefficient position information for a non-square block of video data; (3) techniques for determining contexts for entropy coding significant coefficient position information for a non-square block of video data; and (4) techniques for coding values, or "levels," of residual transform coefficients of a non-square block of video data.

The techniques of this disclosure may improve efficiency for coding residual transform coefficients of non-square blocks of video data relative to other methods. In particular, the techniques may improve compression of the residual transform coefficients of the non-square blocks and related syntax information, when the coefficients and the information are coded. Additionally, the techniques of this disclosure may enable using coding systems that have lower complexity relative to other systems to code the coefficients and the related syntax information. In this manner, there may be a relative bit savings for a coded bitstream including the coded coefficients and related syntax information, and a relative reduction in complexity for a system used to code the coefficients and the related syntax information, when using the techniques of this disclosure.

Figure 1:
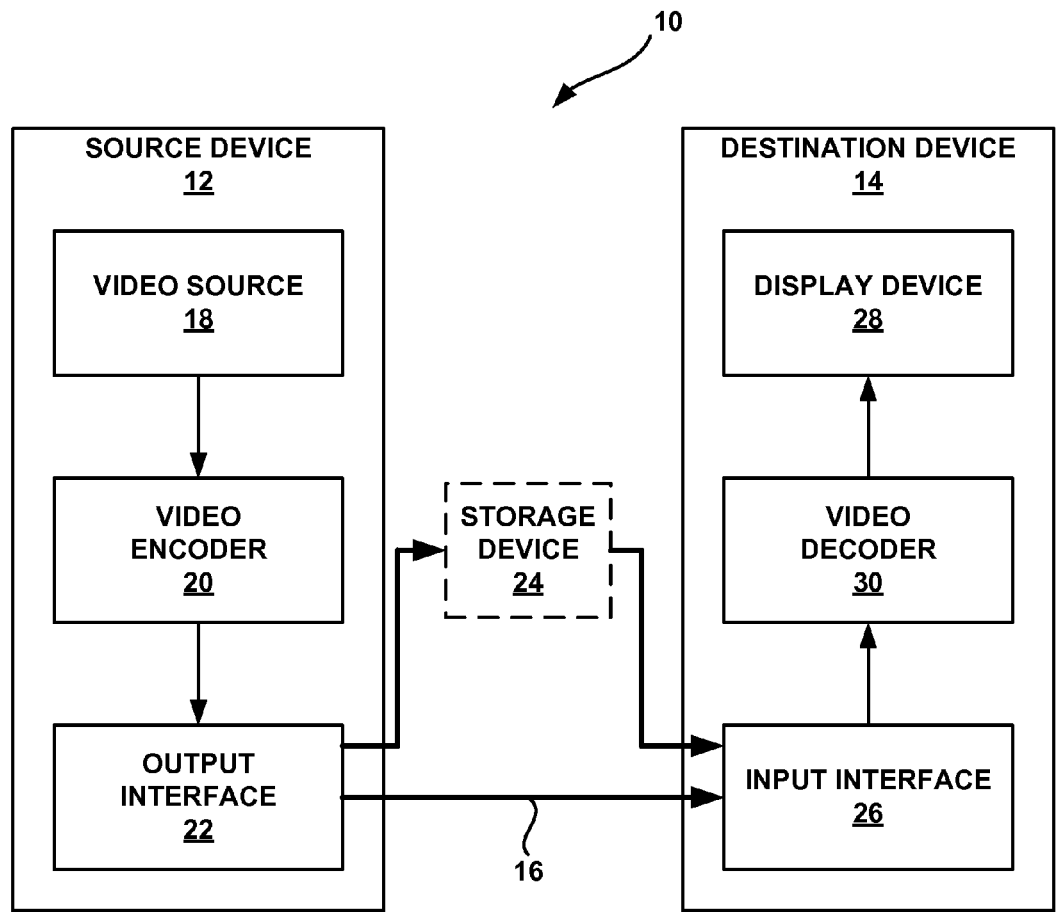
FIG. 1 is a block diagram that illustrates an example of a video encoding and decoding system that may perform techniques for coding residual transform coefficients of a non-square block of video data, consistent with the techniques of this disclosure.

FIG. 1 is a block diagram that illustrates an example of a video encoding and decoding system that may perform techniques for coding residual transform coefficients of a non-square block of video data, consistent with the techniques of this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 24. Similarly, encoded data may be accessed from storage device 24 by input interface 26. Storage device 24 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 24 may correspond to a file server or another intermediate storage device that may hold the encoded video generated by source device 12. Destination device 14 may access stored video data from storage device 24 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 24 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 24 for later access by destination device 14 or other devices, for decoding and/or playback.

Destination device 14 includes an input interface 26, a video decoder 30, and a display device 28. In some cases, input interface 26 may include a receiver and/or a modem. Input interface 26 of destination device 14 receives the encoded video data over link 16. The encoded video data communicated over link 16, or provided on storage device 24, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 28 may be integrated with, or external to, destination device 14. In some examples, destination device 14 may include an integrated display device and also be configured to interface with an external display device. In other examples, destination device 14 may be a display device. In general, display device 28 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG), and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263. A recent draft of the HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San %20Jose/wg11/JCTVC-H1003-v22.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In H.264 and the emerging HEVC standard, when CABAC entropy coding is used, the positions of the significant (i.e., non-zero) residual transform coefficients within a block of video data are coded prior to coding the absolute values, or "levels" of the coefficients. The process of coding the positions of the significant coefficients within the block is called significance map (SM) coding. An SM for a block of video data is generally represented as a 2-D array of binary values, i.e., ones and zeros, in which the ones indicate positions of significant coefficients within the block, and the zeros indicate positions of non-significant, or zero-valued, coefficients within the block. The ones and the zeros may be referred to as "significant coefficient flags." In some cases, only the ones and the zeros that are signalled in the bitstream may be referred to as "significant coefficient flags," for example, the ones and the zeros that precede a last significant coefficient flag according to a scanning order associated with the block, as described below, and sometimes including the last significant coefficient flag itself.

Additionally, in some cases, the SM may be further represented using another 2-D array of ones and zeros, in which a one indicates a position of a last significant coefficient within the block according to a scanning order associated with the block, and the zeros indicate positions of all other coefficients within the block. In these cases, the ones and the zeros may be referred to as "last significant coefficient flags." Once again, in some examples, only the ones and the zeros that are signalled in the bitstream may be referred to as "last significant coefficient flags." For example, in cases where the position of the last significant coefficient is represented using an ordinal (e.g., a string of the zeros and the one of the 2-D array serialized according to the scanning order), only the zeros preceding the one according to the scanning order, and the one itself, may be referred to as "last significant coefficient flags." In other examples, the position of the last significant coefficient may be represented using coordinates, e.g., x- and y-coordinates, of the last significant coefficient with the block according to the scanning order.

Figures 4A, 4B, 4C:
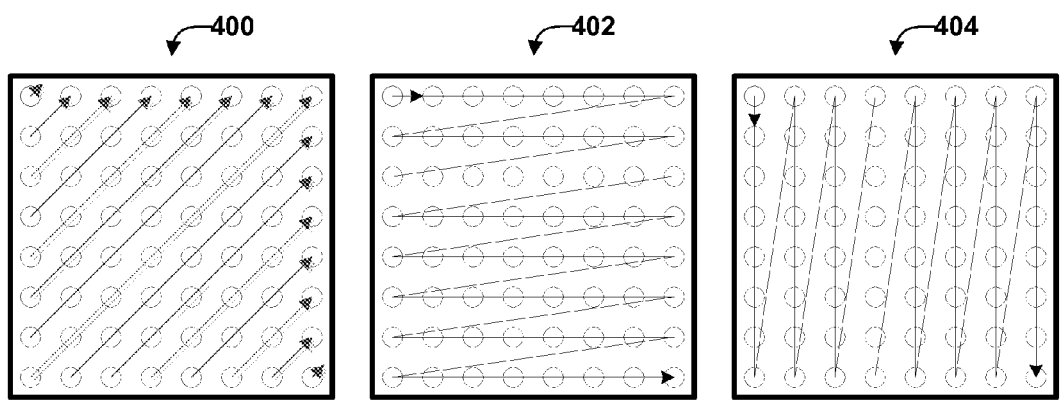
FIGS. 4A-4C are conceptual diagrams that illustrate examples of square blocks of video data scanned using diagonal, horizontal, and vertical scanning orders.
Figure 6A:
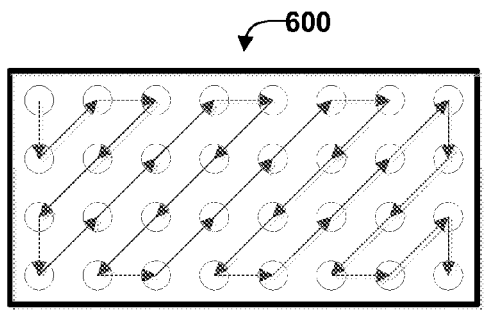
FIGS. 6A-6F are conceptual diagrams that illustrate examples of non-square blocks of video data scanned using zig-zag, horizontal, vertical, and diagonal scanning orders, consistent with the techniques of this disclosure.
Figure 6E:
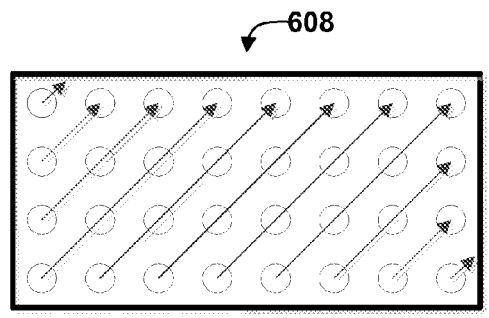
Figure 6B:
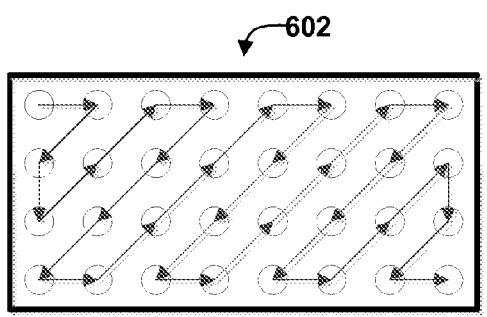
Figure 6F:
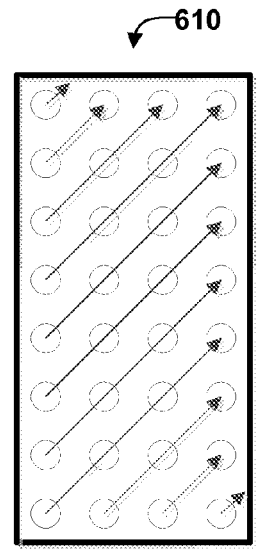
Figure 6C:
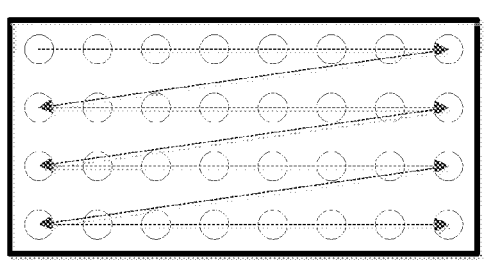
Figure 6D:
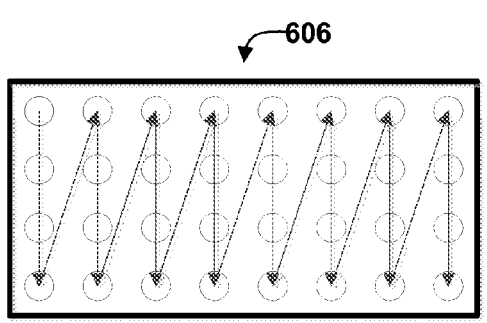

In general, SM coding for a block of video data typically consumes a significant percentage of the video bitrate used to code the block. For example, in some techniques, (e.g., HEVC), the following three scanning orders may be used for SM coding: diagonal scanning order 400, horizontal scanning order 402, and vertical scanning order 404, as shown in the corresponding blocks within FIGS. 4A-4C.

After the SM for the block is coded, the value, or "level," of each non-zero residual transform coefficient of the block (e.g., represented as an absolute value and a sign) is coded. For example, to code SM information and residual transform coefficient levels for a block of video data using the CABAC process previously specified in the H.264 standard, an absolute value of each non-zero residual transform coefficient is converted into binary form, or "binarized," e.g., using a unary (e.g., truncated unary) and/or Golomb (e.g., Exponential-Golomb, or Rice-Golomb) codeword comprising one or more bits, or "bins." Each significant coefficient flag and last significant coefficient flag (which, as explained above, may be one of the significant coefficient flags) for the block already comprises a single bin, and thus bypasses binarization. The CABAC context derivation for each significant coefficient (e.g., for each significant coefficient flag and last significant coefficient flag) of the block includes a consideration of a type of the block (e.g., block size), and a position of the coefficient (e.g., corresponding to the respective flag) within the block, and possibly the position of the coefficient according to a scanning order associated with the block, as well as values of previously coded coefficients. The CABAC context for each bin of a binarized residual transform coefficient absolute value includes a position of the bin within the unary (e.g., truncated unary) and/or Golomb (e.g., Exponential-Golomb, or Rice-Golomb) codeword that represents the absolute value of the coefficient, and values of previously coded coefficients.

According to some video coding techniques, block-based intra-coding may use N×N square partitions of CUs as PUs. In some examples, pixels inside a given square partition of a PU may be predicted from boundaries (i.e., edge pixels) of neighbouring reconstructed PUs, sometimes producing poor predictions for pixels in, e.g., the right-bottom portion of the PU than for other portions of the PU.

To better exploit spatial correlations, so-called "short distance intra-prediction" (SDIP) coding techniques have been proposed. For example, SDIP techniques may include partitioning an N×N square block into several lines or non-square blocks with a rectangular shape. In the block, pixels may be predicted and reconstructed line by line or rectangle by rectangle. As a result, the prediction distance may be shortened.

In some techniques that use SDIP, a CU may be partitioned into PUs as lines or non-square blocks with a rectangular shape. For example, a 32×32 CU may be partitioned into four 8×32 PUs, or four 32×8 PUs. Similarly, a 16×16 CU may be partitioned into four 8×8 PUs, as well as into four 4×16 PUs, or four 16×4 PUs. Moreover, a 4×16 or a 16×4 PU may be further partitioned into four 1×16 PUs, or four 16×1 PUs. Also, an 8×8 CU may also be partitioned into four 2×8 PUs, or four 8×2 PUs.

Additionally, some techniques may also use non-square TUs. For example, techniques that include so-called inter- "non-square transforms," or inter NSQT may use non-square TUs. As such, the inter NSQT and SDIP techniques described above may introduce non-square transforms (NSQT) for inter-prediction and intra-prediction, respectively, and, more generally, non-square blocks of video data, in some coding techniques.

According to some such techniques where non-square blocks of video data are used, when coding non-square blocks of video data, residual transform coefficients of a particular non-square block may be mapped from the non-square block into a square block for the purpose of entropy coding the coefficients, as previously described. Such mapping may be required because the entropy coding process used within the particular technique may only be configured to handle square blocks. In other words, while the previously described prediction, transform, and quantization steps may be performed for non-square blocks in a similar manner as described above, techniques that use non-square blocks may require that the residual transform coefficients of the blocks are mapped into square blocks prior to entropy coding the coefficients.

The approach described above has several drawbacks. As one example, the mapping described above is problematic when using a CABAC process, which may code residual transform coefficients of a block of video data based on their positions within the block. For example, the mapping of residual transform coefficients of a non-square block from the non-square block into a square block for purposes of entropy coding the coefficients may result in loss of correlation among the coefficients that is inherently present in the non-square block. As one example, non-zero residual transform coefficients may be concentrated, or grouped, within a subset of the non-square block, e.g., near a top-left corner of the block commonly referred to as the "DC" position. Mapping the residual transform coefficients of the non-square block into a square block may eliminate such a concentration, or grouping. However, such groupings may be advantageous when selecting a scanning order used to code the block. For example, because of the grouping, certain scanning orders may be used to code the block more efficiently than other scanning orders. As another example, the approach described above also adds complexity to the coding process, associated with the mapping of residual transform coefficients of non-square blocks from the non-square blocks into square blocks prior to entropy encoding the coefficients, and subsequently, from the square blocks into the non-square blocks after entropy coding the coefficients.

This disclosure describes several techniques that may, in some cases, reduce or eliminate some of the drawbacks described above. In particular, the techniques described herein may enable efficient entropy coding of residual transform coefficients of non-square blocks of video data when performing a context adaptive entropy coding process (e.g., CABAC, PIPE, etc.). Additionally, the techniques of this disclosure may enable coding systems to have a lower complexity relative to other systems to code the coefficients.

As one example, this disclosure proposes techniques for determining a scanning order used to code residual transform coefficients of a non-square block of video data. For example, according to some video coding techniques (e.g., HEVC), scanning orders used to code blocks of video data generally include the zig-zag, horizontal, diagonal, and vertical scanning orders, as previously described. The techniques of this disclosure propose using the zig-zag, horizontal, diagonal, or vertical scanning order, as illustrated in FIGS. 6A-6F, to code a particular non-square block of video data, depending on an intra-prediction mode used to code the block. Additionally, the techniques of this disclosure propose using the zig-zag, horizontal, diagonal, or vertical scanning orders to code the block when the block includes 64 or fewer residual transform coefficients, irrespective of the intra-prediction mode used to code the block. Other example techniques include using a single, fixed scanning order to code the block when the block includes more than 64 residual transform coefficients, irrespective of the intra-prediction mode used to code the block.

As another example, this disclosure also proposes techniques for coding a position of a last significant coefficient within a non-square block of video data according to a scanning order associated with the block using context adaptive entropy coding (e.g., CABAC), where one or more of a width and a height of the block are used to determine contexts. As a general example, in cases where the last significant coefficient position for the block is coded using x- and y-coordinates of the 2D block, the context used for coding each coordinate may be determined using a length, corresponding to a number of block positions, of the corresponding dimension of the block. For example, the context for coding the x-coordinate may include the number of block positions in the horizontal dimension (i.e., width) of the block, while the context for coding the y-coordinate may be determined using the number of block positions in the vertical dimension (i.e., height) of the block. Examples of a position of a last significant coefficient within a non-square block of video data according to a scanning order associated with the block, as well as a significance map (SM) for the non-square block, and the non-square block itself, are illustrated in FIGS. 5A-5C.

In examples where one of the dimensions of the block includes a single position (e.g., the block comprises a single row or column), while the other dimension of the block includes multiple positions (e.g., multiple rows or columns), only the coordinate that corresponds to the dimension with multiple positions is coded. For example, for an M×1 block, comprising M columns and a single row, only the x-coordinate may be coded. Similarly, for a 1×N block, comprising 1 column and N rows, only the y-coordinate may be coded.

In examples where one of the dimensions of the block includes two positions (e.g., the block comprises two rows or columns), while the other dimension of the block includes, e.g., more than two positions, the coordinate that corresponds to the dimension that includes more than two positions is coded using a context determined using a value of the coordinate that corresponds to the dimension that includes two positions. For example, for an M×2 block, comprising M columns and 2 rows, the x-coordinate may be coded using information that indicates whether the y-coordinate corresponds to the first or the second row to determine the context. Similarly, for a 2×N block, comprising 2 columns and N rows, the y-coordinate may be coded using information that indicates whether the x-coordinate corresponds to the first or the second column to determine a context. In these examples, the determination of the context used for coding each coordinate may still include a consideration of a length of the corresponding dimension of the block, as previously described.

As yet another example, this disclosure proposes techniques for coding a significance map for the non-square block of video data using context adaptive entropy coding (e.g., CABAC). In particular, the disclosure proposes techniques of coding significant coefficient flags, i.e., significant coefficient position information, for the block using context adaptive entropy coding. A context model, i.e., one or more contexts, used to code the significant coefficient position information for the block may be shared when coding significant coefficient position information for other blocks of different sizes. For example, a common context model may be used when coding significant coefficient position information for N×M and M×N blocks. To code the significant coefficient position information for the N×M block, the common context model may be applied directly, i.e., the one or more contexts may be used directly to code the significant coefficient position information for the N×M block. On the other hand, to code the significant coefficient position information for the M×N block, the common context model and the one or more contexts included therein may be applied by transposing the M×N block to resemble the N×M block, as illustrated in FIGS. 7A-7B. In this case, the transposed dimensions of the block, and the transposed position of each significant coefficient within the block according to the scanning order, may correspond to the common context model and the one or more contexts included therein. Furthermore, the common context model and the one or more contexts may be updated using significant coefficient position information for both the N×M block and the M×N block. Once again, in the case of the M×N block, the common context model may be updated using the significant coefficient position information for the transposed, rather than the original M×N block, or vice versa. In another example, rather than transposing the M×N block itself, the x- and y-coordinates of each coefficient of the M×N block may be transposed, or "swapped," prior to coding the significant coefficient position information for the block, as described above.

This proposed technique exploits a similarity discovered during empirical testing between statistics for an N×M block and an M×N block, that indicate probabilities of each position within the respective block containing a significant coefficient. This similarity allows using a common context model (and the one or more contexts included therein) that includes statistics used to code both N×M blocks and M×N blocks. As a result of sharing a common context model to code significant coefficient position information for non-square blocks of multiple sizes, the number of context models (and contexts) used to code non-square blocks of video data in the corresponding coding system may be reduced compared to other coding systems, thus possibly resulting is more efficient use of system resources.

In one example, coding significant coefficient position information for non-square blocks that include 64 or fewer residual transform coefficients uses the position of each coefficient within the block to determine a context. In another example, coding significant coefficient position information for non-square blocks that include 64 or fewer residual transform coefficients uses the position of each coefficient within the block according to a scanning order associated with the block to determine a context. For blocks that include more than 16 coefficients, coding significant coefficient position information uses coding contexts determined for multiple neighboring coefficients. For example, four adjacent coefficients may share a common context. In this manner, a context individually determined for a significant coefficient flag corresponding to a coefficient within a smaller block may be "mapped" into a larger block to be used to code significant coefficient flags corresponding to multiple adjacent coefficients within the larger block. For blocks that include more than 64 coefficients, coding significant coefficient position information uses coding contexts determined by the number of significant neighboring coefficients. For example, the significances of five neighboring coefficients are added to compute the context.

As another example, for 16×1 blocks, comprising 16 columns and a single row, the context for coding a particular significant coefficient flag may be determined using a column number corresponding to a position of the corresponding coefficient within the block according to a scanning order associated with the block. In this case, the scanning order is the horizontal scanning order that proceeds from the leftmost block position to the rightmost position. For 1×16 blocks, comprising a single column and 16 rows, the context for coding a particular significant coefficient flag may be the same as described above, since the block is transposed to resemble a 16×1 block prior to coding the significant coefficient flags for the block. In this example, the context for coding a particular significant coefficient flag for either the 16×1 block or the transposed 1×16 block may be derived using the following relationship:

$$Ctx(x) = x;$$

where ctx(x) indicates the context index for the particular significant coefficient flag being coded, and "x" indicates the x-coordinate of the position of the coefficient corresponding to the flag within the block.

As another example, for 8×2 blocks, comprising 8 columns and 2 rows, the context for coding a particular significant coefficient flag may be derived using the following relationship:

$$Ctx(x,y) = (x) + (y << 3);$$

where ctx(x,y) indicates the context index for the particular significant coefficient flag being coded, where "<<" indicates a left shift operator, and "y" indicates the y-coordinate of the position of the coefficient corresponding to the flag within the block. In other words, ctx(x,y) indicates the context index for the significant coefficient flag being coded, wherein the flag corresponds to a coefficient that is located at the position within the block indicated by the x- and y-coordinates. As such, the context for coding a particular significant coefficient flag may be derived using x- and y-coordinates of the position of coefficient corresponding to the flag within the block. Similarly, for 2×8 blocks, comprising 2 columns and 8 rows, the context for coding a particular significant coefficient flag may be derived using the same relationship, once again, after the block is transposed to resemble an 8×2 block, as previously described.

As still another example, for 16×4 blocks, comprising 16 columns and 4 rows, the context for coding a particular significant coefficient flag may be derived using the following relationship:

$$\begin{aligned}
&\text{if } (x <= 1 \;\&\&\; x <= 1) \\
&\{ \\
&\quad Ctx(x,y) = x + (y << 1); \\
&\} \\
&\text{else if } (x < 8) \\
&\{ \\
&\quad Ctx(x,y) = 3 + (x >> 1) + ((y >> 1) << 2); \\
&\} \\
&\text{else} \\
&\{ \\
&\quad Ctx(x,y) = 9 + (x >> 2) + ((y >> 1) << 1); \\
&\}
\end{aligned}$$

where, ">>" indicates a right shift operator.

As illustrated by this relationship, the context is determined differently for significant coefficient flags corresponding to coefficients located in the different subsets, or sub-blocks of the 16×4 block. For example, the context may vary depending on whether a coefficient corresponding to a particular significant coefficient flag being coded is located within a 2×2 sub-block originating at the DC position within the block, indicated by x- and y-coordinates (0,0), (0,1), (1,0) and (1,1) within the block. The context may further vary for flags corresponding to coefficients located outside of the 2×2 sub-block, but within a sub-block defined by the x-coordinate being less than 8, and for all other positions within the block. Similarly, for 4×16 blocks, comprising 4 columns and 16 rows, the context for coding a particular significant coefficient flag may be derived using the same relationship, once again, after the block is transposed to resemble a 16×4 block, as previously described.

In a similar manner as described above, for 32×8 blocks, comprising 32 columns and 8 rows, and their counterpart 8×32 blocks, the context for coding a particular significant coefficient flag may be computed in a similar way as currently performed in HEVC, as previously described.

Additionally, as described in greater detail with reference to FIGS. 8A-8B, this disclosure also proposes techniques for coding significant coefficient position information for each of a square block of video data and a non-square block of video data using a common context model, i.e., a same one or more contexts.

Figure 9A:
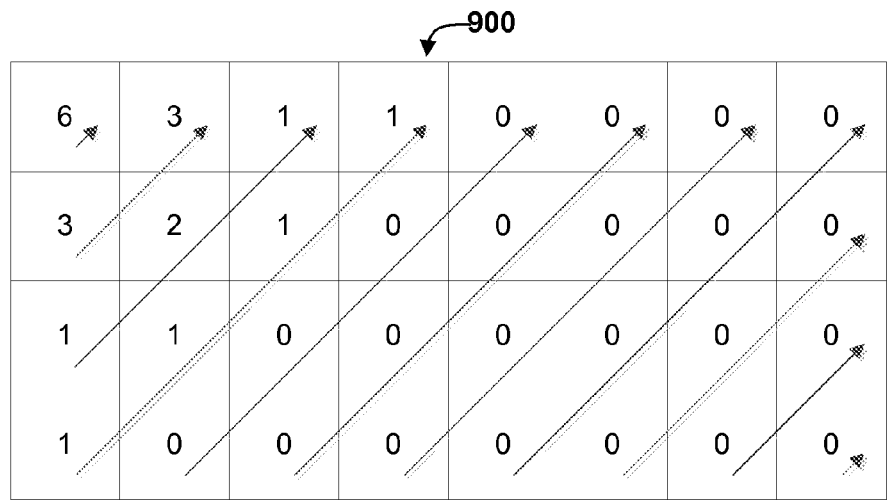
FIGS. 9A-9B are conceptual diagrams that illustrate an example of a non-square block of video data for which residual transform coefficients have been grouped according to a diagonal scanning order, consistent with the techniques of this disclosure.
Figure 9B:
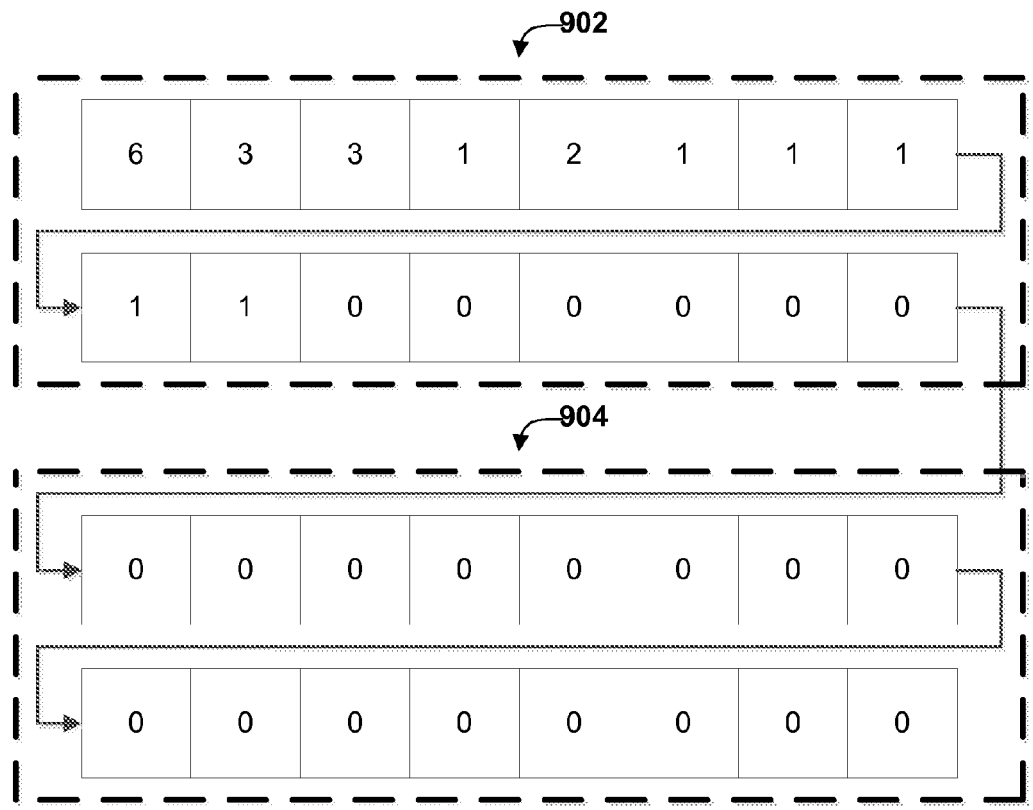

Finally, this disclosure also proposes techniques for coding the value, or "level" information (e.g., represented as an absolute value and a sign) of residual transform coefficients of a non-square block of video data, as illustrated in FIGS. 9A-9B. For example, according to some video coding techniques (e.g., HEVC), to code residual transform coefficient levels of a square block, the block is divided into 4×4 sub-blocks, each comprising 16 coefficients. The coefficients within each 4×4 sub-block are subsequently coded according to a scanning order associated with the sub-block. This disclosure proposes coding residual transform coefficient levels of a non-square block of video data by first serializing the coefficients using a scanning order associated with the block, and then dividing the serialized coefficients into groups of 16 coefficients along the scanning order. The coefficient levels are then coded within each group.

Accordingly, in some examples consistent with the techniques of this disclosure, video encoder 20 of source device 12 may be configured to encode certain blocks of video data (e.g., one or more TUs of a CU), and video decoder 30 of destination device 14 may be configured to receive the encoded video data from video encoder 20. As one example, video encoder 20 and/or video decoder 30 may be configured to code transform coefficients associated with a block of video data during a video coding process, wherein the block has a non-square shape defined by a width and a height. For example, video encoder 20 and/or video decoder 30 may be configured to code one or more of x- and y-coordinates that indicate a position of a last non-zero coefficient within the block according to a scanning order associated with the block. In this example, to code each of the one or more of the x- and y-coordinates, video encoder 20 and/or video decoder 30 may be configured to determine one or more contexts used to code the respective coordinate based at least in part on one of the width and the height of the block that corresponds to the coordinate. Video encoder 20 and/or video decoder 30 may be further configured to code the respective coordinate by performing a context adaptive entropy coding process based at least in part on the determined one or more contexts.

As another example, video encoder 20 and/or video decoder 30 may be once again configured to code transform coefficients associated with a block of video data during a video coding process, wherein the block has a non-square shape defined by a width and a height. For example, video encoder 20 and/or video decoder 30 may be configured to code information that identifies positions of non-zero coefficients within the block, wherein to code the information, video encoder 20 and/or video decoder 30 may be configured to determine one or more contexts used to code the information based at least in part on one or more of the width and the height of the block. Video encoder 20 and/or video decoder 30 may be further configured to code the information by performing a context adaptive entropy coding process based at least in part on the determined one or more contexts.

In the examples described above, the one or more contexts used to code the respective one of the x- and y-coordinates being determined based at least in part on the one of the width and the height of the block that corresponds to the coordinate, and the one or more contexts used to code the information that identifies the positions of the non-zero coefficients within the block being determined based at least in part on the one or more of the width and the height of the block, may result in probability estimates included within the one or more contexts of each example being more accurate relative to probability estimates determined using other techniques. As a result, video encoder 20 and/or video decoder 30 may code each of the one or more of the x- and y-coordinates that indicate the position of the last non-zero coefficient within the block according to the scanning order associated with the block, and the information that identifies the positions of the non-zero coefficients within the block, more efficiently. For example, video encoder 20 and/or video decoder 30 may code the x- and y-coordinates and the information using fewer bits than when using other techniques to code the coordinates and the information, e.g., techniques that do not take into account the width and the height of the block, and which may result in less accurate probability estimates.

Furthermore, as described in greater detail below with reference to FIGS. 2 and 3, the techniques of this disclosure may also enable video encoder 20 and/or video decoder 30 to have less complexity relative to other systems, in particular, when coding the information that identifies the positions of the non-zero coefficients within the block, by coding the information for each of multiple blocks having transposed dimensions (e.g., 4×8 and 8×4), or different dimensions (e.g., 4×4 and 2×8) using common contexts. Moreover, this disclosure further includes novel techniques for scanning transform coefficients of non-square blocks of video data, as well as techniques for coding information that identifies values, or "levels," of non-zero coefficients within the blocks, as also described in greater detail below with reference to FIGS. 2 and 3.

Accordingly, the techniques of this disclosure may enable video encoder 20 and/or video decoder 30 to code the transform coefficients associated with the block more efficiently than when using other methods. In particular, the techniques may improve compression of the transform coefficients of the block and related syntax information (e.g., the last significant coefficient position information and the significant coefficient position information for the block), when the coefficients and the information are coded. Additionally, the techniques may enable video encoder 20 and/or video decoder 30 to have lower complexity relative to other systems to code the coefficients and the related syntax information. In this manner, there may be a relative bit savings for a coded bitstream including the coded coefficients and related syntax information, and a relative reduction in complexity for video encoder 20 and/or video decoder 30 used to code the coefficients and the related syntax information, when using the techniques of this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
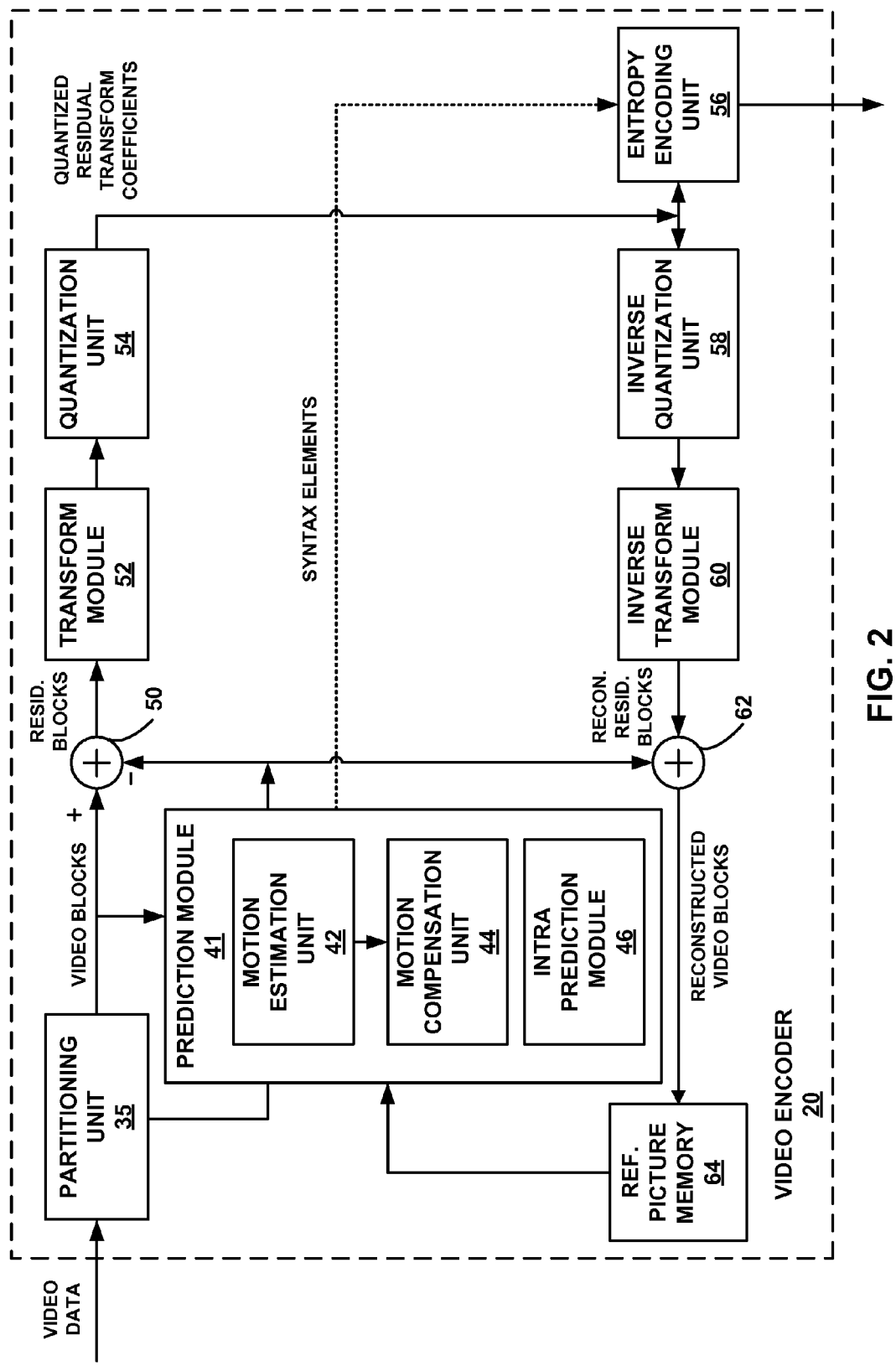
FIG. 2 is a block diagram that illustrates an example of a video encoder that may perform the techniques for encoding residual transform coefficients of a non-square block of video data, consistent with the techniques of this disclosure.

FIG. 2 is a block diagram that illustrates an example of a video encoder 20 that may implement the techniques described in this disclosure related to coding residual transform coefficients of a non-square block of video data. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction module 41, reference picture memory 64, summer 50, transform module 52, quantization unit 54, and entropy encoding unit 56. Prediction module 41 includes motion estimation unit 42, motion compensation unit 44, and intra-prediction module 46. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra-prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block via either inter-prediction or intra-prediction, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

As one example, video encoder 20 may be configured to code transform coefficients associated with a block of video data during a video coding process, wherein the block has a non-square shape defined by a width and a height. In this example, the block may be a TU of a CU, as previously described.

For example, video encoder 20 may be configured to code one or more of x- and y-coordinates that indicate a position of a last non-zero coefficient within the block according to a scanning order associated with the block (i.e., last significant coefficient position information for the block). To code each of the one or more of the x- and y-coordinates, video encoder 20 may be configured to determine one or more contexts used to code the respective coordinate based at least in part on one of the width and the height of the block that corresponds to the coordinate. Video encoder 20 may be further configured to code the respective coordinate by performing a context adaptive entropy coding process (e.g., a CABAC process) based at least in part on the determined one or more contexts.

In some examples, the width of the block may correspond to the x-coordinate, and the height of the block may correspond to the y-coordinate. In other words, to code the x-coordinate, video encoder 20 may be configured to use the width of the block to determine the one or more contexts for coding the x-coordinate. Similarly, to code the y-coordinate, video encoder 20 may be configured to use the height of the block to determine the one or more contexts for coding the y-coordinate.

In other examples, to code the one or more of the x- and y-coordinates, video encoder 20 may be configured to, in the event one of the width and the height of the block equals "1," indicating that the one of the width and the height comprises a single block position, not code one of the x- and y-coordinates that corresponds to the one of the width and the height.

In still other examples, to code the one or more of the x- and y-coordinates, video encoder 20 may be configured to, in the event one of the width and the height of the block equals "2," indicating that the one of the width and the height comprises two block positions, and in the event another one of the width and the height of the block equals a value greater than "2," indicating that the other one of the width and the height comprises more than two block positions, further determine the one or more contexts used to code the other one of the x- and y-coordinates that corresponds to the other one of the width and the height that equals a value greater than "2" based at least in part on the one of the x- and y-coordinates that corresponds to the one of the width and the height that equals "2."

As another example, video encoder 20 may once again be configured to code transform coefficients associated with a block of video data during a video coding process, wherein the block has a non-square shape defined by a width and a height. In this example, once again, the block may be a TU of a CU, as previously described.

For example, video encoder 20 may be configured to code information that identifies positions of non-zero coefficients within the block (i.e., significant coefficient position information for the block), wherein to code the information, video encoder 20 may be configured to determining one or more contexts used to code the information based at least in part on one or more of the width and the height of the block. Video encoder 20 may be further configured to code the information by performing a context adaptive entropy coding process (e.g., a CABAC process) based at least in part on the determined one or more contexts.

In some examples, video encoder 20 may be further configured to, for each of one or more of the positions of the non-zero coefficients within the block, interchange x- and y-coordinates that indicate the respective position within the block prior to coding the information that identifies the positions of the non-zero coefficients within the block.

In other examples, video encoder 20 may be further configured to transpose the block prior to coding the information that identifies the positions of the non-zero coefficients within the block. In these examples, the one or more of the width and the height of the block may comprise one or more of a width and a height of the transposed block. As one example, to transpose the block prior to coding the information, video encoder 20 may be configured to transpose the block in the event the width of the block is greater than the height of the block. As another example, to transpose the block prior to coding the information, video encoder 20 may be configured to transpose the block in the event the height of the block is greater than the width of the block.

In some examples, the block may be a first block. In these examples, video encoder 20 may be further configured to code information that identifies positions of non-zero coefficients within a second block, wherein the second block is different than the first block, and wherein the second block has a square shape defined by a size. In these examples, to code the information, video encoder 20 may be configured to code the information by performing a context adaptive entropy coding process based at least in part on the determined one or more contexts used to code the information that identifies the positions of the non-zero coefficients within the first block.

In this manner, as previously described, video encoder 20 may have less complexity relative to other systems, in particular, when coding the information that identifies the positions of the non-zero coefficients within the block. Specifically, as described above, video encoder 20 may code information that identifies positions of non-zero coefficients within multiple blocks having transposed dimensions, or different dimensions, using a same one or more contexts.

In these examples, video encoder 20 may be further configured to determine, based on the width and the height of the first block, and on the size of the second block, that the first block and the second block include a same number of coefficients, and map at least one position of a coefficient within the first block and at least one position of a coefficient within the second block to at least one common context of the determined one or more contexts. Also in these examples, video encoder 20 may be further configured to update the determined one or more contexts based on the information that identifies the positions of the non-zero coefficients within the first block and the information that identifies the positions of the non-zero coefficients within the second block.

In further examples, video encoder 20 may also be configured to select a scanning order from a group of scanning orders as a scanning order associated with the block based on an intra-prediction mode associated with the block, when the block comprises a predetermined number of coefficients or fewer, and select a fixed scanning order as the scanning order associated with the block, when the block comprises more than the predetermined number of coefficients, Video encoder 20 may be further configured to code the transform coefficients using the selected scanning order associated with the block.

In some examples, the predetermined number of coefficients may comprise sixty-four coefficients. In other examples, the group of scanning orders and the fixed scanning order may each comprise at least one of a zig-zag scanning order, a horizontal scanning order, a vertical scanning order, and a diagonal scanning order. As one example, the diagonal scanning order may scan the block starting from a smaller one of the width and the height of the block. As another example, the diagonal scanning order may scan the block starting from a larger one of the width and the height of the block.

In still other examples, video encoder 20 may also be configured to code information that identifies values of non-zero transform coefficients within the block, including serializing the transform coefficients associated with the block using a scanning order associated with the block, partitioning the serialized transform coefficients into one or more groups that each include a predetermined number of the serialized transform coefficients, and coding information that identifies values of non-zero transform coefficients within each group.

In some examples, the predetermined number of coefficients may comprise sixteen coefficients. In other examples, to code the information that identifies the values of the non-zero transform coefficients within the block, video encoder 20 may be configured to code the information when at least one of the width and the height of the block is not equal to a value that is an integer multiple of "4."

Accordingly, as explained above, the techniques of this disclosure may enable video encoder 20 to encode the transform coefficients associated with the block more efficiently than when using other methods. In particular, the techniques may improve compression of the transform coefficients of the block and related syntax information (i.e., the last significant coefficient position information and the significant coefficient position information for the block), when the coefficients and the information are encoded. Additionally, the techniques may enable video encoder 20 to have lower complexity relative to other systems to encode the coefficients and the related syntax information. In this manner, there may be a relative bit savings for a coded bitstream including the encoded coefficients and related syntax information, and a relative reduction in complexity for video encoder 20 used to encode the coefficients and the related syntax information, when using the techniques of this disclosure.

In this manner, video encoder 20 represents an example of a video coder included within an apparatus for coding transform coefficients associated with a block of video data during a video coding process, wherein the block has a non-square shape defined by a width and a height, wherein the video coder configured to code one or more of x- and y-coordinates that indicate a position of a last non-zero coefficient within the block according to a scanning order associated with the block, wherein to code each of the one or more of the x- and y-coordinates, the video coder is configured to determine one or more contexts used to code the respective coordinate based at least in part on one of the width and the height of the block that corresponds to the coordinate, and code the respective coordinate by performing a context adaptive entropy coding process based at least in part on the determined one or more contexts. Additionally, video encoder 20 also represents an example of a video coder included within an apparatus for coding transform coefficients associated with a block of video data during a video coding process, wherein the block has a non-square shape defined by a width and a height, wherein the video coder configured to code information that identifies positions of non-zero coefficients within the block, wherein to code the information, the video coder is configured to determine one or more contexts used to code the information based at least in part on one or more of the width and the height of the block, and coding the information by performing a context adaptive entropy coding process based at least in part on the determined one or more contexts.

Figure 3:
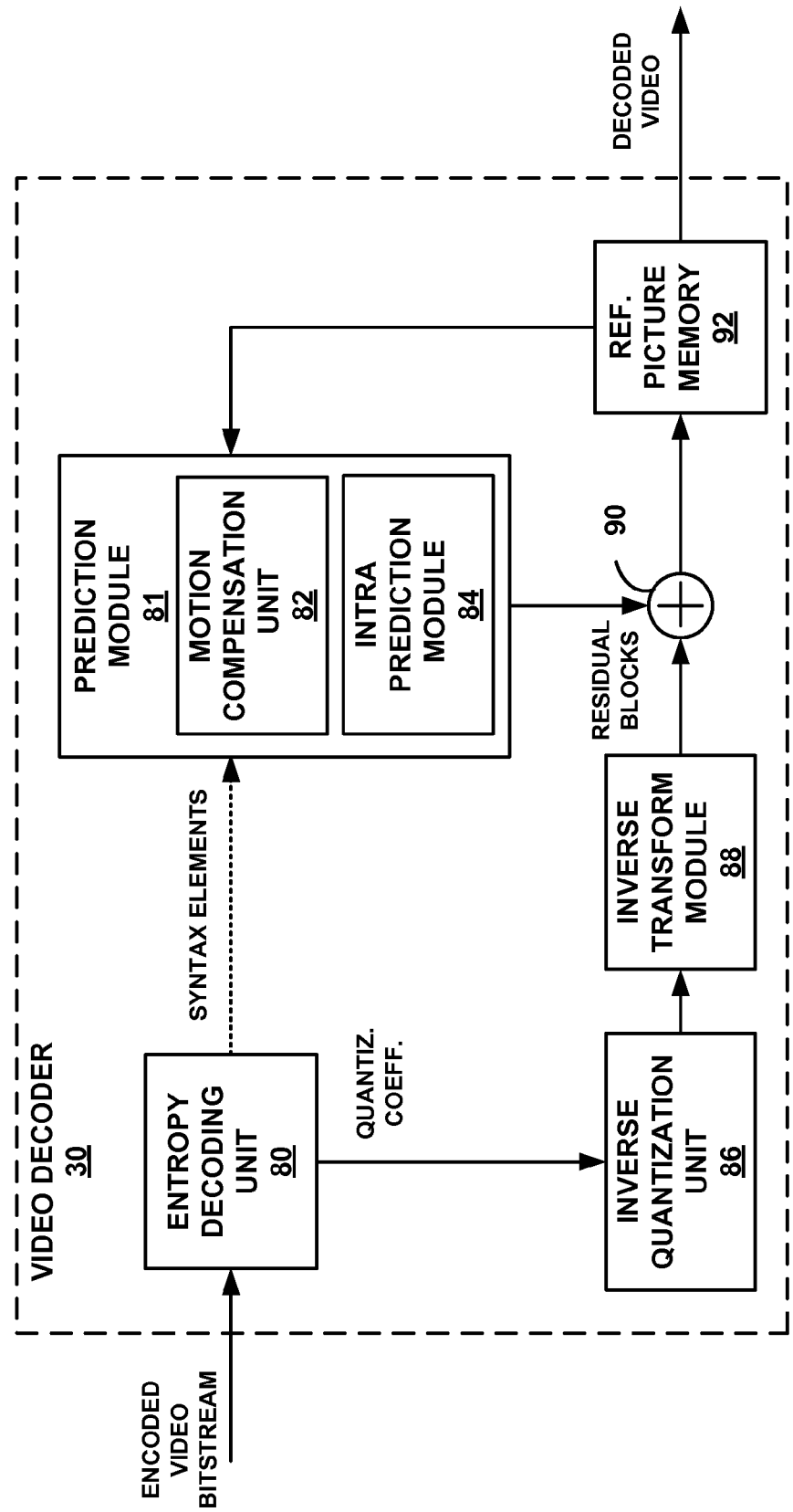
FIG. 3 is a block diagram that illustrates an example of a video decoder that may perform the techniques for decoding encoded residual transform coefficients of a non-square block of video data, consistent with the techniques of this disclosure.

FIG. 3 is a block diagram that illustrates an example of a video decoder 30 that may implement the techniques described in this disclosure related to coding residual transform coefficients of a non-square block of video data. In the example of FIG. 3, video decoder 30 includes an entropy decoding unit 80, prediction module 81, inverse quantization unit 86, inverse transform module 88, summer 90, and reference picture memory 92. Prediction module 81 includes motion compensation unit 82 and intra-prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

When the video slice is coded as an intra-coded (I) slice, intra-prediction module 84 of prediction module 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform module 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 28 of FIG. 1.

As one example, video decoder 30 may be configured to code transform coefficients associated with a block of video data during a video coding process, wherein the block has a non-square shape defined by a width and a height. In this example, the block may be a TU of a CU, as previously described.

For example, video decoder 30 may be configured to code one or more of x- and y-coordinates that indicate a position of a last non-zero coefficient within the block according to a scanning order associated with the block (i.e., last significant coefficient position information for the block), wherein to code each of the one or more of the x- and y-coordinates, video decoder 30 may be configured to determine one or more contexts used to code the respective coordinate based at least in part on one of the width and the height of the block that corresponds to the coordinate. Video decoder 30 may be further configured to code the respective coordinate by performing a context adaptive entropy coding process (e.g., a CABAC process) based at least in part on the determined one or more contexts.

In some examples, the width of the block may correspond to the x-coordinate, and the height of the block may correspond to the y-coordinate. In other words, to code the x-coordinate, video decoder 30 may be configured to use the width of the block to determine the one or more contexts for coding the x-coordinate. Similarly, to code the y-coordinate, video decoder 30 may be configured to use the height of the block to determine the one or more contexts for coding the y-coordinate.

In other examples, to code the one or more of the x- and y-coordinates, video decoder 30 may be configured to, in the event one of the width and the height of the block equals "1," indicating that the one of the width and the height comprises a single block position, not code one of the x- and y-coordinates that corresponds to the one of the width and the height.

In still other examples, to code the one or more of the x- and y-coordinates, video decoder 30 may be configured to, in the event one of the width and the height of the block equals "2," indicating that the one of the width and the height comprises two block positions, and in the event another one of the width and the height of the block equals a value greater than "2," indicating that the other one of the width and the height comprises more than two block positions, further determine the one or more contexts used to code the other one of the x- and y-coordinates that corresponds to the other one of the width and the height that equals a value greater than "2" based at least in part on the one of the x- and y-coordinates that corresponds to the one of the width and the height that equals "2."

As another example, video decoder 30 may once again be configured to code transform coefficients associated with a block of video data during a video coding process, wherein the block has a non-square shape defined by a width and a height. In this example, once again, the block may be a TU of a CU, as previously described.

For example, video decoder 30 may be configured to code information that identifies positions of non-zero coefficients within the block (i.e., significant coefficient position information for the block), wherein to code the information, video decoder is configured to determine one or more contexts used to code the information based at least in part on one or more of the width and the height of the block. Video decoder 30 may be further configured to code the information by performing a context adaptive entropy coding process (e.g., a CABAC process) based at least in part on the determined one or more contexts.

In some examples, video decoder 30 may be further configured to, for each of one or more of the positions of the non-zero coefficients within the block, interchange x- and y-coordinates that indicate the respective position within the block prior to coding the information that identifies the positions of the non-zero coefficients within the block.

In other examples, video decoder 30 may be further configured to transpose the block prior to coding the information that identifies the positions of the non-zero coefficients within the block. In these examples, the one or more of the width and the height of the block may comprise one or more of a width and a height of the transposed block. As one example, to transpose the block prior to coding the information, video decoder 30 may be configured to transpose the block in the event the width of the block is greater than the height of the block. As another example, to transpose the block prior to coding the information, video decoder 30 may be configured to transpose the block in the event the height of the block is greater than the width of the block.

In some examples, the block may be a first block. In these examples, video decoder 30 may be further configured to code information that identifies positions of non-zero coefficients within a second block, wherein the second block is different than the first block, and wherein the second block has a square shape defined by a size. In these examples, to code the information, video decoder 30 may be configured to code the information by performing a context adaptive entropy coding process based at least in part on the determined one or more contexts used to code the information that identifies the positions of the non-zero coefficients within the first block.

In this manner, as previously described, video decoder 30 may have less complexity relative to other systems, in particular, when encoding the information that identifies the positions of the non-zero coefficients within the block. Specifically, as described above, video decoder 30 may code information that identifies positions of non-zero coefficients within multiple blocks having transposed dimensions, or different dimensions, using a same one or more contexts.

In these examples, video decoder 30 may be further configured to determine, based on the width and the height of the first block, and on the size of the second block, that the first block and the second block include a same number of coefficients, and map at least one position of a coefficient within the first block and at least one position of a coefficient within the second block to at least one common context of the determined one or more contexts. Also in these examples, video decoder 30 may be further configured to update the determined one or more contexts based on the information that identifies the positions of the non-zero coefficients within the first block and the information that identifies the positions of the non-zero coefficients within the second block.

In further examples, video decoder 30 may also be configured to select a scanning order from a group of scanning orders as a scanning order associated with the block based on an intra-prediction mode associated with the block, when the block comprises a predetermined number of coefficients or fewer, and selecting a fixed scanning order as the scanning order associated with the block, when the block comprises more than the predetermined number of coefficients. Video decoder 30 may be further configured to code the transform coefficients using the selected scanning order associated with the block.

In some examples, the predetermined number of coefficients may comprise sixty-four coefficients. In other examples, the group of scanning orders and the fixed scanning order may each comprise at least one of a zig-zag scanning order, a horizontal scanning order, a vertical scanning order, and a diagonal scanning order. As one example, the diagonal scanning order may scan the block starting from a smaller one of the width and the height of the block. As another example, the diagonal scanning order may scan the block starting from a larger one of the width and the height of the block.

In still other examples, video decoder 30 may also be configured to code information that identifies values of non-zero transform coefficients within the block, including coding information that identifies values of non-zero transform coefficients within each of one or more groups that each include a predetermined number of transform coefficients, joining the values for the one or more groups into serialized values, and de-serializing the values using a scanning order associated with the block.

In some examples, the predetermined number of coefficients may comprise sixteen coefficients. In other examples, to code the information that identifies the values of the non-zero coefficients within the block, video decoder 30 may be configured to code the information when at least one of the width and the height of the block is not equal to a value that is an integer multiple of "4."

Accordingly, as explained above, the techniques of this disclosure may enable video decoder 30 to decode the encoded transform coefficients associated with the block more efficiently than when using other methods. In particular, the techniques may improve compression of the transform coefficients of the block and related syntax information (i.e., the last significant coefficient position information and the significant coefficient position information for the block), when the coefficients and the information are encoded and subsequently decoded. Additionally, the techniques may enable video decoder 30 to have lower complexity relative to other systems to decode the coefficients and the related syntax information. In this manner, there may be a relative bit savings for a coded bitstream including the encoded coefficients and related syntax information, and a relative reduction in complexity for video decoder 30 used to decode the coefficients and the related syntax information from the coded bitstream, when using the techniques of this disclosure.

In this manner, video decoder 30 represents an example of a video coder included within an apparatus for coding transform coefficients associated with a block of video data during a video coding process, wherein the block has a non-square shape defined by a width and a height, wherein the video coder configured to code one or more of x- and y-coordinates that indicate a position of a last non-zero coefficient within the block according to a scanning order associated with the block, wherein to code each of the one or more of the x- and y-coordinates, the video coder is configured to determine one or more contexts used to code the respective coordinate based at least in part on one of the width and the height of the block that corresponds to the coordinate, and code the respective coordinate by performing a context adaptive entropy coding process based at least in part on the determined one or more contexts. Additionally, video decoder 30 also represents an example of a video coder included within an apparatus for coding transform coefficients associated with a block of video data during a video coding process, wherein the block has a non-square shape defined by a width and a height, wherein the video coder configured to code information that identifies positions of non-zero coefficients within the block, wherein to code the information, the video coder is configured to determine one or more contexts used to code the information based at least in part on one or more of the width and the height of the block, and code the information by performing a context adaptive entropy coding process based at least in part on the determined one or more contexts.

FIGS. 5A-5C are conceptual diagrams that illustrate an example of a non-square block of video data and corresponding significant coefficient position information and last significant coefficient position information, consistent with the techniques of this disclosure. In the example of FIGS. 5A-5C, block 500 is an 8×4 block that is scanned using a diagonal scanning order shown in FIG. 6E. In a similar manner as described above with reference to N×N blocks of video data, blocks 502 and 504 are blocks of significant coefficient flags and last significant coefficient flags, respectively, for block 500. For example, block position 506 within block 500 corresponds to a last significant coefficient within block 500 according to the diagonal scanning order. Furthermore, block position 508 corresponds to a last one of significant coefficient flags equal to "1" of block 502 according to the diagonal scanning order. Similarly, block position 510 corresponds to a last significant coefficient flag equal to "1" of block 504.

FIGS. 6A-6F are conceptual diagrams that illustrate examples of non-square blocks of video data scanned using zig-zag, horizontal, vertical, and diagonal scanning orders, consistent with the techniques of this disclosure. FIGS. 6A-6F depict examples of zig-zag, horizontal, vertical, and diagonal scanning orders that may be used to code an N×M block of video data, comprising N columns and M rows, where N and M have different values (i.e., the block is non-square), as one aspect of the techniques of this disclosure.

For example, the blocks depicted in each of FIGS. 6A-6E, i.e., blocks 600-608, are 8×4 blocks. As another example, the block depicted in FIG. 6F, i.e., block 610, is a 4×8 block. Each of the scanning orders illustrated in FIG. 6A-6F begins at a top-left corner position, commonly referred to as a "DC" position, within the respective one of blocks 600-610, and proceeds from the DC position to a bottom-right position within the block. For example, block 600 is scanned using one variation of the zig-zag scanning order, block 602 is scanned using another variation of the zig-zag scanning order, block 604 is scanned using the horizontal scanning order, block 606 is scanned using the vertical scanning order, and blocks 608 and 610 are scanned using the diagonal scanning order, as illustrated by the arrows within each block. In other examples, other variations of the zig-zag, horizontal, vertical, and diagonal scanning orders, or other scanning orders, may be used to code non-square blocks of video data, consistent with the techniques of this disclosure.

FIGS. 7A-7B are conceptual diagrams that illustrate an example of a non-square block of video data that has been transposed, consistent with the techniques of this disclosure. As shown in FIGS. 7A-7B, an 8×4 block of video data, block 700, may be transposed to generate a 4×8 block of video data, block 702. The example of FIGS. 7A-7B is merely one example of transposing a non-square block of video data. In other examples, different techniques may be used for transposing a non-square block of video data, consistent with the techniques of this disclosure.

Figure 8A:
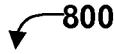
FIGS. 8A-8B are conceptual diagrams that illustrate an example of a square block of video data and a non-square block of video data, for which significant coefficient position information is coded using a common one or more contexts, consistent with the techniques of this disclosure.
Figure 8B:
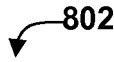

FIGS. 8A-8B are conceptual diagrams that illustrate an example of a square block of video data and a non-square block of video data, for which significant coefficient position information is coded using a common one or more contexts, consistent with the techniques of this disclosure. For example, as previously explained, in accordance with another aspect of the techniques of this disclosure, blocks of video data having different geometries (e.g., square and non-square), and/or orientations (e.g., vertical and horizontal), but a same number of residual transform coefficients, may share a same context model, i.e. a same one or more contexts. As one example, the techniques of this disclosure provide a mapping among the blocks that may be used to determine a context for entropy coding each significant coefficient flag of a particular block. For example, the mapping may assign a same or similar probability (or frequency) value to a particular position within each of the blocks having the various geometries and/or orientations. As previously described, the probability, or frequency value may be indicated using a context index.

According to some techniques that use N×N (i.e., square) blocks of video data, a context used to entropy code each significant coefficient flag of a particular block is dependent upon the position of the flag within the block according to a scanning order associated with the block. As one example, for a 4×4 block of video data and a horizontal scanning order, the context for coding a particular significant coefficient flag may be derived using the following relationship:

$$CtxInc = 4*PosY + PosX$$

CtxInc indicates the context index for the particular significant coefficient flag being coded, and "PosY" and "PosX" indicate the y-coordinate and the x-coordinate, respectively, of the position of the coefficient corresponding to the flag within the N×N block.

According to the techniques of this disclosure, the following relationships define an example of the above-described mapping for 8×2 and 2×8 blocks:

$$\text{If } (PosX<4) CtxInc = 4*PosY + PosX;$$

$$\text{Otherwise, } CtxInc = 4 + 4*PosY + PosX;$$

This mapping assumes that the non-square block has a longer width than a height, although, in other examples, a non-square block may have a longer height than a width.

FIG. 8A illustrates context indices determined for significant coefficient flags of a 4×4 block, block 800, using the relationship described above (i.e., "CtxInc=4*PosY+PosX"). FIG. 8B, in turn, illustrates context indices determined for significant coefficient flags of an 8×2 block, block 802, also using the relationship described above (i.e., "If (PosX<4) CtxInc=4*PosY+PosX; Otherwise, CtxInc=4+4*PosY+PosX").

The techniques described above also may be used to determine contexts for entropy coding significant coefficient flags of non-square blocks that include 64 coefficients, or any number of coefficients.

It should be noted that multiplications by factors of 2 (e.g., 2, 4, 8, 16, etc.) may be accomplished using a "left bit-shift" operation. For instance, the left bit-shift operation "a<<3" is equivalent to "8*a." Similarly, divisions by factors of 2 may be accomplished using a "right bit-shift" operation. For instance, the right bit-shift operation "a>>3" is equivalent to "a/8," rounding to a lower integer. As one example, for determining the above-described contexts for 8×8 blocks, some techniques may use the following relationship:

$$Ctx = 4*(PosY>>1) + (PosX>>1)$$

In accordance with the techniques of this disclosure, the above-described contexts for 16×4 and 4×16 blocks may be determined using the following relationships:

$$PosX1 = PosX - [(PosX >> 3) << 3]$$

$$PosY1 = PosY + [(PosX >> 3) << 2]$$

$$Ctx = 4*(PosY1 >> 1) + (PosX1 >> 1)$$

Similarly, the above-described contexts for 32×2 blocks may be determined using the following relationships:

$$PosX1 = PosX - [(PosX >> 3) << 3]$$

$$PosY1 = PosY + [(PosX >> 3) << 1]$$

$$Ctx = 4*(PosY1 >> 1) + (PosX1 >> 1)$$

In this manner, the probabilities, or frequencies, corresponding to each context, may match quite closely for the 32×2 and 2×32 blocks, and for the 16×4 and 4×16 blocks, with those of the 8×8 block. As such, consistent with the techniques of this disclosure, the contexts for all of the above blocks sizes may be shared.

FIGS. 9A-9B are conceptual diagrams that illustrate an example of a non-square block of video data for which residual transform coefficients have been grouped according to a diagonal scanning order, consistent with the techniques of this disclosure. As shown in FIG. 9A, an 8×4 block of video data, block 900, is scanned using the diagonal scanning order that scans block 900 starting from a smaller dimension (i.e., height) of the block. In other examples, the diagonal scanning order may scan block 900 starting from a larger dimension (i.e., length). As shown in FIG. 9B, the coefficients of block 900 are serialized into two groups of coefficients, group 902 and group 904, wherein each group comprises sixteen coefficients of block 900, in this example. In other examples, block 900 may comprise more or fewer coefficients, and the coefficients may be grouped into more or fewer groups, each comprising any number of coefficients. In any case, the values, or "levels" (e.g., absolute value and signs) of significant coefficients within each group, in this example, group 902 and group 904, may be subsequently coded as described above.

Figure 10A:
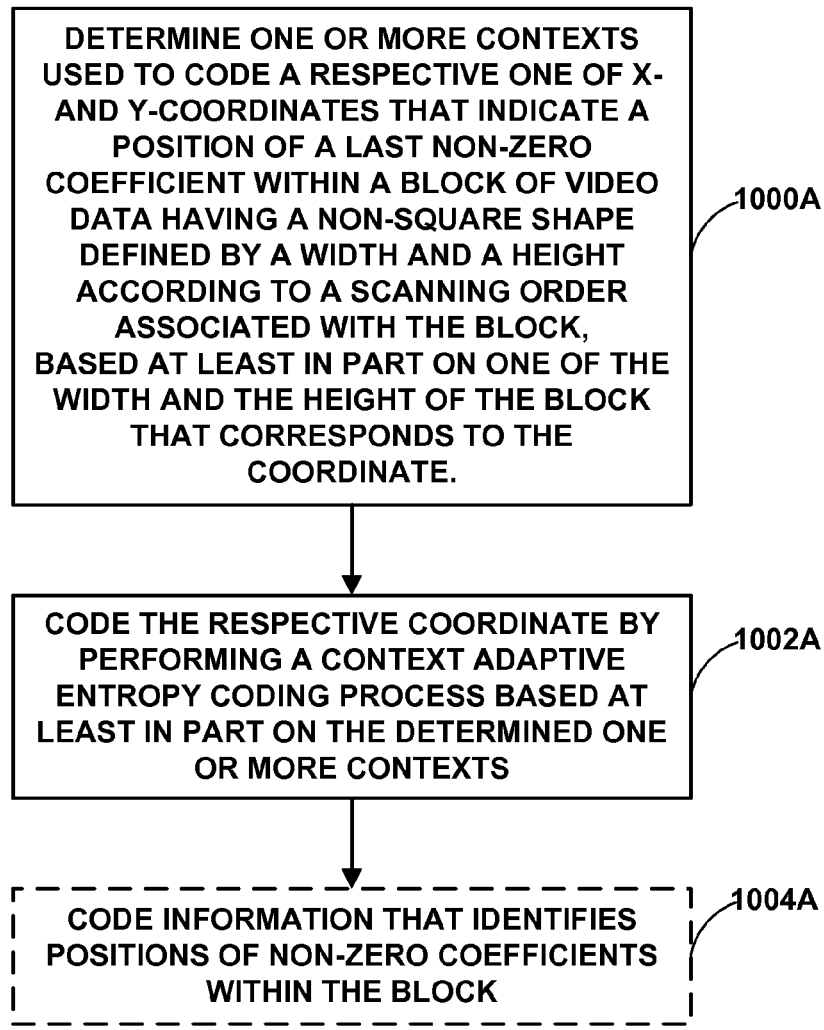
FIGS. 10A-10B are flowcharts that illustrate examples of methods of coding residual transform coefficients of a non-square block of video data, consistent with the techniques of this disclosure.
Figure 10B:
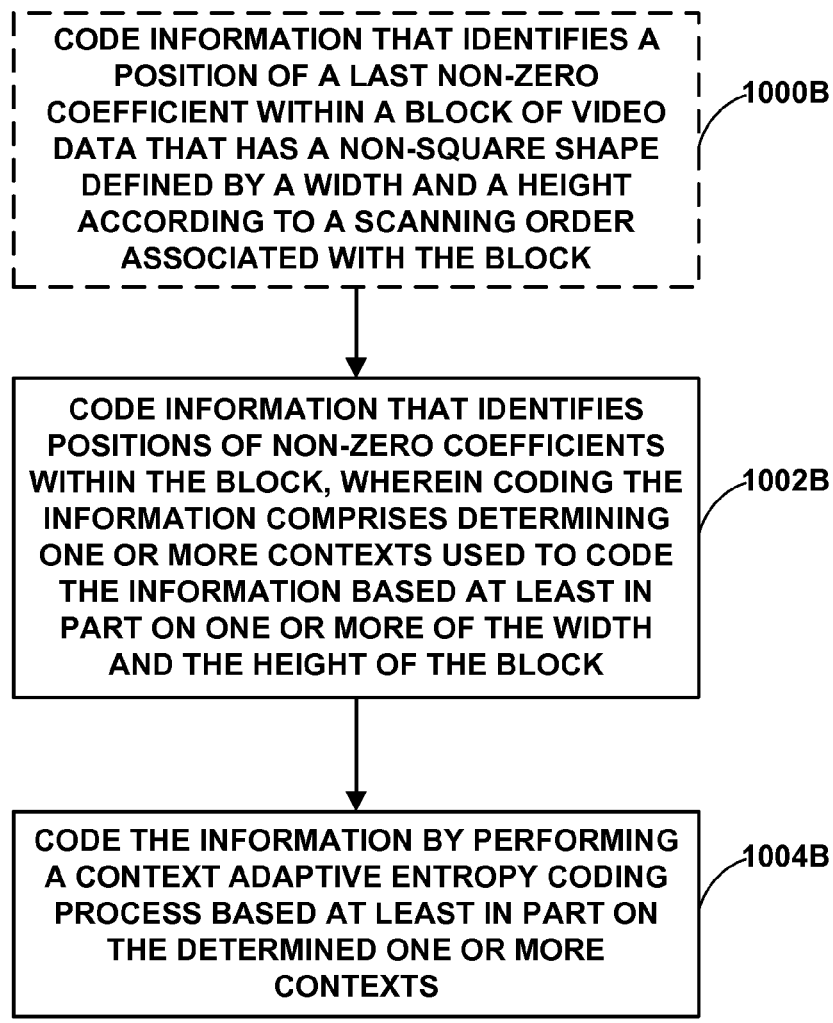

FIGS. 10A-10B are flowcharts that illustrate examples of methods of coding residual transform coefficients of a non-square block of video data, consistent with the techniques of this disclosure. The techniques of FIGS. 10A-10B may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIGS. 10A-10B are described with respect to video encoder 20 (FIGS. 1 and 2) and/or video decoder 30 (FIGS. 1 and 3), although it should be understood that other devices may be configured to perform similar techniques. Moreover, the steps illustrated in FIGS. 10A-10B may be performed in a different order or in parallel, and additional steps may be added and certain steps omitted, without departing from the techniques of this disclosure.

In some examples, video encoder 20 and/or video decoder 30 may code transform coefficients associated with a block of video data during a video coding process, wherein the block has a non-square shape defined by a width and a height. For example, the block may be a TU of a CU, as previously described.

Initially, video encoder 20 and/or video decoder 30 may code one or more of x- and y-coordinates that indicate a position of a last non-zero coefficient within the block according to a scanning order associated with the block. For example, to code each of the one or more of the x- and y-coordinates, video encoder 20 and/or video decoder 30 may determine one or more contexts used to code the respective coordinate based at least in part on one of the width and the height of the block that corresponds to the coordinate (1000A). Video encoder 20 and/or video decoder 30 may further code the respective coordinate by performing a context adaptive entropy coding process based at least in part on the determined one or more contexts (1002A).

In some examples, the width of the block may correspond to the x-coordinate, and the height of the block may correspond to the y-coordinate. In other words, to code the x-coordinate, video encoder 20 and/or video decoder 30 may use the width of the block as to determine the one or more contexts for coding the x-coordinate. Similarly, to code the y-coordinate, video encoder 20 and/or video decoder 30 may use the height of the block to determine the one or more contexts for coding the y-coordinate.

In other examples, to code the one or more of the x- and y-coordinates, video encoder 20 and/or video decoder 30 may, in the event one of the width and the height of the block equals "1," indicating that the one of the width and the height comprises a single block position, not code one of the x- and y-coordinates that corresponds to the one of the width and the height.

In still other examples, to code the one or more of the x- and y-coordinates, video encoder 20 and/or video decoder 30 may, in the event one of the width and the height of the block equals "2," indicating that the one of the width and the height comprises two block positions, and in the event another one of the width and the height of the block equals a value greater than "2," indicating that the other one of the width and the height comprises more than two block positions, further determine the one or more contexts used to code the other one of the x- and y-coordinates that corresponds to the other one of the width and the height that equals a value greater than "2" based at least in part on the one of the x- and y-coordinates that corresponds to the one of the width and the height that equals "2."

Finally, in some examples, video encoder 20 and/or video decoder 30 may further code information that identifies positions of non-zero coefficients within the block (i.e., significant coefficient position information for the block) (1004A).

In other examples, video encoder 20 and/or video decoder 30 may once again code transform coefficients associated with a block of video data during a video coding process, wherein the block has a non-square shape defined by a width and a height. In these examples, once again, the block may be a TU of a CU, as previously described.

Initially, in some examples, video encoder 20 and/or video decoder 30 may code information that identifies a position of a last non-zero coefficient within the block according to a scanning order associated with the block (i.e., last significant coefficient position information for the block) (1000B).

Furthermore, video encoder 20 and/or video decoder 30 may code information that identifies positions of non-zero coefficients within the block (i.e., significant coefficient position information for the block), wherein to code the information, video encoder 20 and/or video decoder 30 may determine one or more contexts used to code the information based at least in part on one or more of the width and the height of the block (1002B). Video encoder 20 and/or video decoder 30 may further code the information by performing a context adaptive entropy coding process based at least in part on the determined one or more contexts (1004B).

In some examples, video encoder 20 and/or video decoder 30 may further, for each of one or more of the positions of the non-zero coefficients within the block, interchange x- and y-coordinates that indicate the respective position within the block prior to coding the information that identifies the positions of the non-zero coefficients within the block.

In other examples, video encoder 20 and/or video decoder 30 may further transpose the block prior to coding the information that identifies the positions of the non-zero coefficients within the block. In these examples, the one or more of the width and the height of the block may comprise one or more of a width and a height of the transposed block. As one example, to transpose the block prior to coding the information, video encoder 20 and/or video decoder 30 may transpose the block in the event the width of the block is greater than the height of the block. As another example, to transpose the block prior to coding the information, video encoder 20 and/or video decoder 30 may transpose the block in the event the height of the block is greater than the width of the block.

In some examples, the block may be a first block. In these examples, video encoder 20 and/or video decoder 30 may further code information that identifies positions of non-zero coefficients within a second block, wherein the second block is different than the first block, and wherein the second block has a square shape defined by a size. In these examples, to code the information, video encoder 20 and/or video decoder 30 may code the information by performing a context adaptive entropy coding process based at least in part on the determined one or more contexts used to code the information that identifies the positions of the non-zero coefficients within the first block.

In these examples, video encoder 20 and/or video decoder 30 may further determine, based on the width and the height of the first block, and on the size of the second block, that the first block and the second block include a same number of coefficients, and map at least one position of a coefficient within the first block and at least one position of a coefficient within the second block to at least one common context of the determined one or more contexts. Also in these examples, video encoder 20 and/or video decoder 30 may further update the determined one or more contexts based on the information that identifies the positions of the non-zero coefficients within the first block and the information that identifies the positions of the non-zero coefficients within the second block.

In further examples, video encoder 20 and/or video decoder 30 may also select a scanning order from a group of scanning orders as a scanning order associated with the block based on an intra-prediction mode associated with the block, when the block comprises a predetermined number of coefficients or fewer, and select a fixed scanning order as the scanning order associated with the block, when the block comprises more than the predetermined number of coefficients. Video encoder 20 and/or video decoder 30 may further code the transform coefficients using the selected scanning order associated with the block.

In some examples, the predetermined number of coefficients may comprise sixty-four coefficients. In other examples, the group of scanning orders and the fixed scanning order may each comprise at least one of a zig-zag scanning order, a horizontal scanning order, a vertical scanning order, and a diagonal scanning order. As one example, the diagonal scanning order may scan the block starting from a smaller one of the width and the height of the block. As another example, the diagonal scanning order may scan the block starting from a larger one of the width and the height of the block.

In still other examples, video encoder 20 and/or video decoder 30 may also code information that identifies values of non-zero transform coefficients within the block, including serializing the transform coefficients associated with the block using a scanning order associated with the block, partitioning the serialized transform coefficients into one or more groups that each include a predetermined number of the serialized transform coefficients, and coding information that identifies values of non-zero transform coefficients within each group.

In some examples, the predetermined number of coefficients may comprise sixteen coefficients. In other examples, to code the information that identifies the values of the non-zero transform coefficients within the block, video encoder 20 and/or video decoder 30 may code the information when at least one of the width and the height of the block is not equal to a value that is an integer multiple of "4."

In this manner, the method of FIG. 10A represents an example of a method of coding transform coefficients associated with a block of video data during a video coding process, wherein the block has a non-square shape defined by a width and a height, the method comprising coding one or more of x- and y-coordinates that indicate a position of a last non-zero coefficient within the block according to a scanning order associated with the block, wherein coding each of the one or more of the x- and y-coordinates includes determining one or more contexts used to code the respective coordinate based at least in part on one of the width and the height of the block that corresponds to the coordinate, and coding the respective coordinate by performing a context adaptive entropy coding process based at least in part on the determined one or more contexts. Furthermore, the method of FIG. 10B represents an example of a method of coding transform coefficients associated with a block of video data during a video coding process, wherein the block has a non-square shape defined by a width and a height, the method comprising coding information that identifies positions of non-zero coefficients within the block, wherein coding the information comprises determining one or more contexts used to code the information based at least in part on one or more of the width and the height of the block, and coding the information by performing a context adaptive entropy coding process based at least in part on the determined one or more contexts.

Additionally, it should be noted that, consistent with the techniques of this disclosure, all of the techniques described above related to coding residual transform coefficients of a non-square block of video data to may be performed separately, together, or in any combination thereof.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding transform coefficients associated with a first block of video data during a video coding process, wherein the first block has a non-square shape defined by a width and a height, and wherein one of the width or height of the block equals "1" block position, the method comprising:
   coding, with a video coder, one or more of x- or y-coordinates that indicate a position of a last non-zero coefficient within the first block according to a scanning order associated with the block
   determining, with the video coder, that the one of the width or the height comprises a single block position;
   determining, with the video coder, one or more contexts used to code a respective x- or y-coordinate based at least in part on one of the width or the height of the block not having the single block position that corresponds to the respective x- or y-coordinate; coding the respective x- or y-coordinate by performing a context adaptive entropy coding process based at least in part on the determined one or more contexts; and
   not coding, with the video coder, the respective x- or y-coordinate corresponding to the width or height of the block having the single block position.

2. The method of claim 1, wherein the width of the first block corresponds to the x-coordinate, and the height of the first block corresponds to the y-coordinate.

3. The method of claim 1, further comprising:
   in the event one of the width or the height of a second block equals "2," determining, with the video coder, that the one of the width or the height comprises two block positions, and in the event another one of the width or the height of the second block equals a value greater than "2," indicating that the other one of the width or the height comprises more than two block positions,
   further determining, with the video coder, the one or more contexts used to code the other one of the x- or y-coordinates that corresponds to the other one of the width or the height that equals a value greater than "2" based at least in part on the one of the x- or y-coordinates that corresponds to the one of the width or the height that equals "2".

4. The method of claim 1, wherein coding comprises encoding, the method further comprising:
   encoding, with the video coder, the first block of video data to produce residual data; and
   transforming, with the video coder, the residual data to produce the transform coefficients.

5. The method of claim 1, wherein coding comprises decoding, the method further comprising:
   inverse transforming, with the video coder, the transform coefficients to produce residual data; and
   decoding, with the video coder, the residual data to produce the first block of video data.

6. The method of claim 1,
   wherein coding the one or more of x- or y-coordinates comprises coding, by a video coder, the one or more of x- or y-coordinates that indicate the position of the last non-zero coefficient within the first block according to the scanning order associated with the block,
   wherein determining that the one of the width and the height comprises the single block position comprises determining, by the video coder, that the one of the width and the height comprises the single block position,
   wherein determining the one or more contexts comprises determining, by the video coder, the one or more contexts used to code a respective x- or y-coordinate based at least in part on one of the width or the height of the block not having the single block position that corresponds to the respective x- or y-coordinate,
   wherein coding the respective x- or y-coordinate comprises coding, by the video coder, the respective x- or y-coordinate by performing the context adaptive entropy coding process based at least in part on the determined one or more contexts, and
   wherein not coding the respective x- or y-coordinate comprises not coding, by the video coder, the respective x- or y-coordinate corresponding to the width or height of the block having the single block position.

7. The method of claim 1,
   wherein coding the one or more of x- or y-coordinates comprises coding, by a means for coding, the one or more of x- or y-coordinates that indicate the position of the last non-zero coefficient within the first block according to the scanning order associated with the block, wherein determining that the one of the width and the height comprises the single block position comprises determining by, means for determining, that the one of the width and the height comprises the single block position, wherein determining the one or more contexts comprises determining, by a means for determining, the one or more contexts used to code a respective x- or y-coordinate based at least in part on one of the width or the height of the block not having the single block position that corresponds to the respective x- or y-coordinate, wherein coding the respective x- or y-coordinate comprises coding, by a means for coding, the respective x- or y-coordinate by performing the context adaptive entropy coding process based at least in part on the determined one or more contexts, and wherein not coding the respective x- or y-coordinate comprises not coding, by a means for not coding, the respective x- or y-coordinate corresponding to the width or height of the block having the single block position.

8. The method of claim 1, wherein coding the one or more of x- or y-coordinates comprises executing, by one or more processors of a device for coding video data, instructions stored on a non-transitory computer-readable storage medium that cause the one or more processors to code the one or more of x- or y-coordinates that indicate the position of the last non-zero coefficient within the first block according to the scanning order associated with the block, wherein determining that the one of the width and the height comprises the single block position comprises executing, by the one or more processors, instructions stored on the non-transitory computer-readable storage medium that cause the one or more processors to determine that the one of the width and the height comprises the single block position, wherein determining the one or more contexts comprises executing, by the one or more processors, instructions stored on the non-transitory computer-readable storage medium that cause the one or more processors to determine the one or more contexts used to code a respective x- or y-coordinate based at least in part on one of the width or the height of the block not having the single block position that corresponds to the respective x- or y-coordinate, wherein coding the respective x- or y-coordinate comprises executing, by the one or more processors, instructions stored on the non-transitory computer-readable storage medium that cause the one or more processors to code the respective x- or y-coordinate by performing the context adaptive entropy coding process based at least in part on the determined one or more contexts, and wherein not coding the respective x- or y-coordinate comprises executing, by the one or more processors, instructions stored on the non-transitory computer-readable storage medium that cause the one or more processors to not code the respective x- or y-coordinate corresponding to the width or height of the block having the single block position.

9. An apparatus configured to code transform coefficients associated with a first block of video data during a video coding process, wherein the first block has a non-square shape defined by a width and a height, and wherein one of the width or height of the block equals "1" block position, the apparatus comprising:

a video memory configured to store the first block of video data; and a video coder in communication with the video memory, the video coder configured to:

code one or more of x- or y-coordinates that indicate a position of a last non-zero coefficient within the first block according to a scanning order associated with the block, wherein to code the one or more of the x- or y-coordinates, the video coder is configured to:

determine that the one of the width or the height comprises a single block position;

determine one or more contexts used to code a respective x- or y-coordinate based at least in part on one of the width or the height of the block not having the single block position that corresponds to the respective x- or y-coordinate;

code the respective x- or y-coordinate by performing a context adaptive entropy coding process based at least in part on the determined one or more contexts; and not code the respective x- or y-coordinate corresponding to the width or height of the block having the single block position.

10. The apparatus of claim 9, wherein the width of the first block corresponds to the x-coordinate, and the height of the first block corresponds to the y-coordinate.

11. The apparatus of claim 9, wherein the video coder is further configured to:

in the event one of the width or the height of a second block equals "2," determine that the one of the width or the height comprises two block positions, and in the event another one of the width or the height of the second block equals a value greater than "2," indicating that the other one of the width or the height comprises more than two block positions, further determine the one or more contexts used to code the other one of the x- or y-coordinates that corresponds to the other one of the width or the height that equals a value greater than "2" based at least in part on the one of the x- or y-coordinates that corresponds to the one of the width or the height that equals "2".

12. The apparatus of claim 9, wherein the apparatus comprises at least one of:

an integrated circuit;
a microprocessor; and
a wireless communication device that includes the video coder.

13. The apparatus of claim 9, wherein the video coder comprises a video encoder, and wherein the video encoder is further configured to:

encode the first block of video data to produce residual data; and transform the residual data to produce the transform coefficients.

14. The apparatus of claim 9, wherein the video coder comprises a video decoder, and wherein the video decoder is further configured to:

inverse transform the transform coefficients to produce residual data; and decode the residual data to produce the first block of video data.

15. A device configured to code transform coefficients associated with a first block of video data during a video coding process, wherein the first block has a non-square shape defined by a width and a height, and wherein one of the width or height of the block equals "1" block position, the device comprising:

means for coding one or more of x- or y-coordinates that indicate a position of a last non-zero coefficient within the first block according to a scanning order associated with the block, wherein the means for coding the one or more of the x- or y-coordinates includes:
means for determining that the one of the width or the height comprises a single block position;
means for determining one or more contexts used to code a respective x- or y-coordinate based at least in part on one of the width or the height of the block not having the single block position that corresponds to the respective x- or y-coordinate;
means for coding the respective x- or y-coordinate by performing a context adaptive entropy coding process based at least in part on the determined one or more contexts; and
means for not coding the respective x- or y-coordinate corresponding to the width or height of the block having the single block position.

16. The device of claim 15, further comprising:
means for determining, in the event one of the width or the height of a second block equals "2," that the one of the width or the height comprises two block positions, and in the event another one of the width or the height of the second block equals a value greater than "2," indicating that the other one of the width or the height comprises more than two block positions,
means for determining the one or more contexts used to code the other one of the x- or y-coordinates that corresponds to the other one of the width or the height that equals a value greater than "2" based at least in part on the one of the x- or y-coordinates that corresponds to the one of the width or the height that equals "2".

17. The device of claim 15, wherein the width of the first block corresponds to the x-coordinate, and the height of the first block corresponds to the y-coordinate.

18. The device of claim 15, wherein coding comprises encoding, the device further comprising:
means for encoding the first block of video data to produce residual data; and
means for transforming the residual data to produce the transform coefficients.

19. The device of claim 15, wherein coding comprises decoding, the device further comprising:
means for inverse transforming the transform coefficients to produce residual data; and
means for decoding the residual data to produce the first block of video data.

20. A non-transitory computer-readable storage medium storing instructions that, when executed, cause one or more processors to code transform coefficients associated with a first block of video data during a video coding process, wherein the first block has a non-square shape defined by a width and a height, wherein one of the width or height of the block equals "1" block position, and wherein the instructions cause the one or more processors to:
code one or more of x- or y-coordinates that indicate a position of a last non-zero coefficient within the first block according to a scanning order associated with the block, wherein coding the one or more of the x- or y-coordinates comprise instructions that cause the one or more processors to:
determine that the one of the width or the height comprises a single block position;
determine one or more contexts used to code a respective x- or y-coordinate based at least in part on one of the width or the height of the block not having the single block position that corresponds to the respective x- or y-coordinate;
code the respective x- or y-coordinate by performing a context adaptive entropy coding process based at least in part on the determined one or more contexts; and
not code the respective x- or y-coordinate corresponding to the width or height of the block having the single block position.

21. The non-transitory computer-readable storage medium of claim 20, wherein the width of the first block corresponds to the x-coordinate, and the height of the first block corresponds to the y-coordinate.

22. The non-transitory computer-readable storage medium of claim 20, wherein the instructions further cause the one or more processors to:
in the event one of the width or the height of a second block equals "2," determine that the one of the width or the height comprises two block positions, and in the event another one of the width or the height of the second block equals a value greater than "2," indicating that the other one of the width or the height comprises more than two block positions,
further determine the one or more contexts used to code the other one of the x- or y-coordinates that corresponds to the other one of the width or the height that equals a value greater than "2" based at least in part on the one of the x- or y-coordinates that corresponds to the one of the width or the height that equals "2".

23. The non-transitory computer-readable storage medium of claim 20, wherein coding comprises encoding, and wherein the instructions further cause the one or more processors to:
encode the first block of video data to produce residual data; and
transform the residual data to produce the transform coefficients.

24. The non-transitory computer-readable storage medium of claim 20, wherein coding comprises decoding, and wherein the instructions further cause the one or more processors to:
inverse transform the transform coefficients to produce residual data; and
decode the residual data to produce the first block of video data.

* * * * *